United States Patent [19]
Bouman et al.

[11] Patent Number: 5,615,472
[45] Date of Patent: Apr. 1, 1997

[54] METHOD OF ADJUSTING A STATOR COIL LACING MACHINE

[75] Inventors: David G. Bouman, Ossian, Ind.; Larry D. Moser, Ohio City, Ohio; Keith W. Moser, Fort Wayne, Ind.

[73] Assignee: Alliance Winding Equipment, Inc., Fort Wayne, Ind.

[21] Appl. No.: 473,256

[22] Filed: Jun. 7, 1995

Related U.S. Application Data

[62] Division of Ser. No. 114,216, Aug. 30, 1993, Pat. No. 5,485,670.

[51] Int. Cl.⁶ .................................................. H02K 15/02
[52] U.S. Cl. ...................... 29/596; 112/470.23; 242/432.6
[58] Field of Search .............................. 29/596, 605, 606, 29/732–736; 66/1 R; 112/470.03, 470.04, 470.23; 140/101, 102, 115; 242/432.6, 433.4

[56] References Cited

U.S. PATENT DOCUMENTS

| | | | |
|---|---|---|---|
| 2,580,871 | 1/1952 | Wirtz | 66/1 R |
| 2,883,949 | 4/1959 | Ammann | 112/470.23 |
| 3,050,019 | 8/1962 | Muskulus | 112/470.23 |
| 3,082,966 | 3/1963 | Frederick | 242/432.6 X |
| 3,227,382 | 1/1966 | Frederick | 242/432.6 |
| 3,323,558 | 6/1967 | Collins | 140/101 X |
| 3,338,273 | 8/1967 | Kalning | 140/101 |
| 3,342,223 | 9/1967 | Hall et al. | 140/102 X |
| 3,344,760 | 10/1967 | Muskulus et al. | 112/470.23 |
| 3,344,813 | 10/1967 | Kaiser | 140/101 |
| 3,440,979 | 4/1969 | Frederick | 66/1 R X |
| 3,659,337 | 5/1972 | Gawthrop et al. | 29/606 |
| 3,685,470 | 8/1972 | Frederick | 112/470.23 |
| 3,813,754 | 6/1974 | Fields et al. | 29/732 X |
| 3,824,940 | 7/1974 | Habegger et al. | 29/596 X |
| 3,844,235 | 10/1974 | Habegger | 29/596 X |
| 3,862,493 | 1/1975 | Habegger et al. | 29/596 X |
| 3,985,162 | 10/1976 | Redman | 140/101 X |
| 4,107,592 | 8/1978 | Bayer | 112/470.03 X |
| 4,156,443 | 5/1979 | Nishikawa et al. | 140/101 |
| 4,312,283 | 1/1982 | Fischer et al. | 112/470.04 X |
| 4,412,163 | 10/1983 | Angersbach et al. | 112/470.03 |
| 4,614,161 | 9/1986 | Frederick | 29/596 X |
| 4,671,465 | 6/1987 | Lemley et al. | 29/732 X |
| 5,010,638 | 4/1991 | Lanfranco | 29/596 |

FOREIGN PATENT DOCUMENTS

| | | | |
|---|---|---|---|
| 54-104502 | 8/1979 | Japan | 29/596 |
| 94565 | 7/1980 | Japan | 29/596 |
| 2-214445 | 8/1990 | Japan | 29/732 |
| 3-98440 | 4/1991 | Japan | 29/732 |

*Primary Examiner*—Peter Vo
*Attorney, Agent, or Firm*—Barnes & Thornburg

[57] ABSTRACT

A method of adjusting a stator coil lacing machine to accommodate a range of different stator stack heights which method does not require disassembly of the machine. The method utilizes a stator coil lacing machine which includes stitching means for stitching lacing cord around coils of the stator, delivering means positioned within the arbor for delivering lacing cord to the stitching means, and securing means positioned within the arbor for securing the lacing cord. The method involves orienting a stator on the arbor of the stator coil lacing machine, and adjusting the delivering means, the stitching means, and the securing means to accommodate the particular stack height of the stator. Each of these adjustments can be made without dissembling the machine.

6 Claims, 3 Drawing Sheets

FIG 1

METHOD OF ADJUSTING A STATOR COIL LACING MACHINE

This is a divisional of application Ser. No. 08/114,216, filed Aug. 30, 1993 now U.S. Pat. No. 5,485,670.

BACKGROUND AND SUMMARY OF THE INVENTION

The present invention relates to a stator coil lacing machine for lacing the stator end turns of an electrodynamic machine. More particularly, the present invention relates to a stator coil lacing machine having improved cord handling capabilities and lacing cord handling components that can be adjusted without disassembly of the machine so that the machine accommodates a range of stator stack heights.

Electrodynamic machines include such things as induction motors. These motors typically include a stator and a rotor. The stator may include a metallic core with a plurality of coils or windings running through the core. An alternating current may be passed through these coils to generate an alternating magnetic flux field. The rotor may have a plurality of coils or windings in which an alternating current is induced by the alternating magnetic flux field of the stator. The end coils or end turns of the stator are grouped together at axial ends of the stator and are often laced or stitched together to prevent their interfering with other components of a device. The end turns are often coated with an epoxy or resin subsequent to stitching. This coating helps reduce movement of the wires and provides an insulative barrier between the wires and other objects. Lacing in this case helps assure that the coils are tightly grouped together prior to coating.

Lacing machines for lacing stator coils are known. Use of a stator coil lacing machine avoids many of the manual operations otherwise necessary for lacing or stitching stator end coils and thus often reduces labor costs and increases productivity and quality.

Stators come in a variety of sizes depending on the particular application in which the stator is used. Stator coil lacing machines are accordingly often constructed to accommodate a range of different stator sizes. However, with some of these machines, it is necessary for the operator to disassemble various parts of the machine in order to adjust one or more of the lacing cord handling components thereof so as to accommodate a particular stator size. The necessity for such manual disassembly adds labor costs and increases production time.

Some stator coil lacing machines have one or more pneumatically or fluidly actuated clamps located inside the arbor of the machine on which the stator is oriented during lacing of the end turns thereof. Machines with such clamps often result in arbors having large longitudinal lengths in order to accommodate the stroke of the one or more pneumatically or fluidly actuated clamps. The larger the longitudinal length of the arbor, the more effort is required to place the stator on and remove the stator from the arbor.

Some stator coil lacing machines utilize clamps that are externally mounted relative to arbors of the machines. These clamps are used to pull lacing cord stitched around end turns of a stator upon completion of the lacing thereof in order to set any knots formed to secure the stitching. These external clamps often generate excess pieces of lacing cord that must be cut and vacuumed away prior to removal of a stator from a machine. This results in waste of lacing cord and the need for extra components for a machine.

Another characteristic of some stator coil lacing machines is that the leads of the stator must be manually held and moved during lacing of the coils of the stator. The leads must be held and moved in order to prevent them from coming into contact with the one or more lacing needles of the stator coil lacing machine. Thus, one or both of the hands of the operator of a stator coil lacing machine is/are preoccupied during lacing of the coils of the stator. This has the disadvantage of preventing the operator from performing other tasks during stator coil lacing and thus lowers his or her productivity. In addition, a potential safety hazard exists in that fingers or hands of an inadvertent or careless operator may come in contact with moving components of the stator coil lacing machine such as the lacing needles.

A stator coil lacing machine having lacing cord handling components that can be adjusted without disassembly of the machine so as to accommodate a range of stator sizes, would be a welcome improvement. Also, reduction in the longitudinal length of the arbor would allow an operator to more easily place a stator on and remove a stator from the arbor. Such reduction could be achieved by eliminating the use of hydraulic or fluidly actuated clamps inside the arbor. In addition, elimination of excess lacing cord that needs to be cut and vacuumed away because of the use of external clamps would be a welcome improvement. Such improvement would conserve on lacing cord and reduce machine components. Finally, a stator coil lacing machine that releasably secures the leads of the stator during lacing of the coils thereof so as to prevent the leads from coming into contact with the lacing needles would also be a welcome improvement.

Accordingly, the present invention includes a stator coil lacing machine having structure for orienting a stator on the stator coil lacing machine so that the stator coils thereof can be laced. The orienting means includes an arbor on which the stator is placed. The stator coil lacing machine also includes structure for stitching lacing cord around the stator coils and cord handling structure for receiving a continuous length of cord and delivering the cord to the stitching structure. The cord handling structure is disposed entirely within the arbor. The stator coil lacing machine of the present invention has adjusting structure that allows for the adjustment of the relative positioning of the stitching structure and cord handling structure without disassembly of the machine so that the machine accommodates a range of stator stack heights.

The stitching structure may include a needle. The adjusting structure may include a rail that is substantially perpendicular to the needle, a needle housing in which the needle is disposed, a clamp that surrounds a peripheral portion of the rail, a portion of the clamp being attached to the needle housing, and at least one screw that threadingly engages the clamp to releasably secure the clamp around the peripheral portion of the rail along at least a portion of the longitudinal length of the rail.

The cord handling structure may include a cord feeder tube having lacing cord disposed therein and at least one cord pin attached to the feeder tube for directing lacing cord toward the stitching structure. The adjusting structure may include a clamp collar and at least one screw that releasably secures the clamp collar to the cord feeder tube and the cord pin. In one embodiment, the clamp collar and cord pin may surround a peripheral portion of the cord feeder tube and have two screws threadingly engaging the clamp collar and cord pin to releasably secure the cord pin and clamp collar around a periphery portion of the cord feeder tube along at least a portion of a longitudinal length of the cord feeder tube.

The cord handling structure may also include a clamp for securing the cord. The adjusting structure may include a screw that threadingly engages the clamp and releasably secures the clamp along a longitudinal length of the arbor.

Structure may be provided for holding the leads of the stator during stator coil lacing so that the leads do not come in contact with the stitching structure. The holding structure may include a lead retainer. The lead retainer may include a block having at least one groove formed therein for receiving and securing the stator leads and a hinge that allows the block to pivotally move with respect to the stator.

The stator coil lacing machine may further include cutting structure for cutting the lacing cord upon completion of the lacing of the stator coils of the stator. The adjusting structure may adjust the positioning of the cutting structure relative to the positioning of the handling structure so as to accommodate a range of stator stack heights. The cutting structure may include a cutting mechanism having a single heated wire for melting through the cord delivered by the handling structure. The adjusting structure may include a rail, a clamp attached to the cutting structure and surrounding a peripheral portion of the rail, and at least one screw that threadingly engages the clamp to releasably secure the clamp around the peripheral portion of the rail along at least a portion of the longitudinal length of the rail.

In a preferred embodiment, the stator coil lacing machine includes an inner arbor having an adjusting slot and an opening. The adjusting slot and opening extend along a part of a longitudinal length of separate portions of the periphery of the inner arbor. The stator coil lacing machine further includes an outer arbor within which a portion of the inner arbor is disposed so that the outer arbor surrounds the periphery of the inner arbor. The outer arbor has an access slot along at least a part of a longitudinal length of a periphery of the outer arbor. The access slot is disposed adjacent the adjusting slot of the inner arbor. The outer arbor further has an opening defined therein along at least a part of a longitudinal length of a different portion of the periphery of the outer arbor than that portion of the periphery in which the access slot is defined. The opening of the outer arbor is disposed adjacent the opening of the inner arbor. A cord feeder tube is disposed in the inner arbor for supplying lacing cord. Upper and lower lacing needles are provided for stitching lacing cord around the stator coils. Upper and lower cord pins are attached to the cord feeder tube and disposed in the openings of the inner and outer arbors so that the upper and lower cord pins direct lacing cord towards the upper and lower needles, respectively. First adjusting structure is provided for adjusting the position of the upper cord pin along at least a portion of a longitudinal length of the cord feeder tube. The first adjusting structure is accessible via the openings in the inner and outer arbors. Second adjusting structure is provided for adjusting the positioning of the upper lacing needle. An upper clamp is mounted within the inner and outer arbors and has a portion disposed in the openings of the inner and outer arbors. The upper clamp is drivingly engaged by the inner arbor. Third adjusting structure is provided for adjusting the position of the upper clamp along the adjusting slot of the inner arbor. The third adjusting structure is accessible via the access slot in the outer arbor. A lower clamp is drivingly attached to the inner arbor and disposed in the openings of the inner and outer arbors.

The first adjusting structure may include a clamp collar and at least one screw that releasably secures the clamp collar to the cord feeder tube and the upper cord pin. The clamp collar and a bar portion of the upper cord pin may surround a peripheral portion of the cord feeder tube and have two screws threadingly engaging the bar portion and the clamp collar to releasably secure the bar portion and the clamp collar around the peripheral portion of the cord feeder tube.

The second adjusting structure may include a rail that is substantially perpendicular to the upper lacing needle, a needle housing in which the upper lacing needle is disposed, a clamp that surrounds a peripheral portion of the rail, a portion of the clamp being attached to the needle housing, and at least one screw that threadingly engages the clamp to releasably secure the clamp around a peripheral portion of the rail along at least a portion of the longitudinal length of the rail.

The peripheral portions of the upper and lower clamps may engage the lacing cord supplied by the respective upper and lower cord pins during certain portions of the lacing of the stators such that the lacing cord directed by the upper and lower cord pins is fixedly secured against movement between the peripheral portions of the upper and lower clamps and peripheral portions of the outer arbor that define the opening therein.

The third adjusting structure may include a screw disposed in the adjusting slot of the inner arbor that threadingly engages the upper clamp and releasably secures the upper clamp along the adjusting slot of the inner arbor. The upper clamp may include a ring clamp that is disposed around a periphery portion of the cord feeder tube, a generally L-shaped clamp attached to the ring clamp, a portion of the L-shaped clamp being disposed in the openings of the inner and outer arbors, and a key attached to the ring clamp and disposed in the adjusting slot of the inner arbor such that the upper clamp is drivingly engaged by the inner arbor.

The first, second and third adjusting structures may adjust the relative positioning of the respective upper cord pin, upper needle, and upper clamp so as to accommodate a range of stator stack heights.

The stator coil lacing machine of the preferred embodiment may further include structure for holding the leads of the stator during stator coil lacing such that the leads do not come in contact with the upper and lower lacing needles during lacing. The holding structure may include a lead retainer.

The stator coil lacing machine of the preferred embodiment may also include structure for cutting the lacing cord directed by the upper and lower cord pins upon completion of the lacing of the stator coils of the stator. The cutting structure may include an upper cutting mechanism having a single heated wire for melting through the cord of the upper cord pin and a lower cutting mechanism having a single heated wire for melting through the cord of the lower cord pin. The positioning of the upper cutting mechanism may be adjustable relative to the positioning of the upper cord pin so as to accommodate a range of stator stack heights.

The present invention provides a method of adjusting a stator coil lacing machine without disassembly of the machine to accommodate a range of stator stack heights. The adjustment method includes the steps of orienting a stator on an arbor of the stator coil lacing machine so that the coils thereof can be laced, the stator having a particular stack height. Adjusting structure disposed within the arbor for delivering cord to be laced around the stator coils, the adjustment being made so as to accommodate the particular stack height of the stator. Adjusting structure for stitching the cord around the stator coils, the adjustment being made so as to accommodate the particular stack height of the stator and position the stitching structure relative to the delivering structure. Adjusting structure disposed within the arbor for securing the cord, the adjustment being made so as to accommodate the particular stack height of the stator and position the securing structure relative to the delivering structure and stitching structure. The delivering structure, stitching structure, and securing structure are all adjustable without disassembly of the stator coil lacing machine.

The above method may allow the delivering structure, stitching structure, and securing structure to be adjusted via loosening and subsequent tightening of screws that can be accessed without disassembly of the stator coil lacing machine. The stator coil lacing machine may further include the step of adjusting structure for cutting through the cord of the delivering structure upon completion of the lacing of the stator coils of the stator. This adjustment is made so as to accommodate the particular stator stack height of the stator and position the cutting structure relative to the delivering structure, stitching structure, and securing structure.

The stator coil lacing machine may have both upper and lower delivering structure, upper and lower stitching structure, and upper and lower securing structure. If such is the case, only the upper delivering structure, upper stitching structure, and upper securing structure need be adjusted so as to accommodate the particular stack height of the stator. The above method may further include the step of adjusting the upper structure for cutting lacing cord upon completion of the lacing of the stator coils of the stator. This adjustment is made so as to accommodate the particular stack height of the stator and position the upper cutting structure relative to the upper delivering structure, upper stitching structure, and upper securing structure.

The above method may further include the step of positioning a lead retainer around leads of a stator during lacing of the stator coils of the stator.

Other objects, advantages and novel features of the present invention will become apparent from the following detailed description of the invention when considered in conjunction with the accompanying drawings.

DETAILED DESCRIPTION OF THE DRAWINGS

Figure 1:
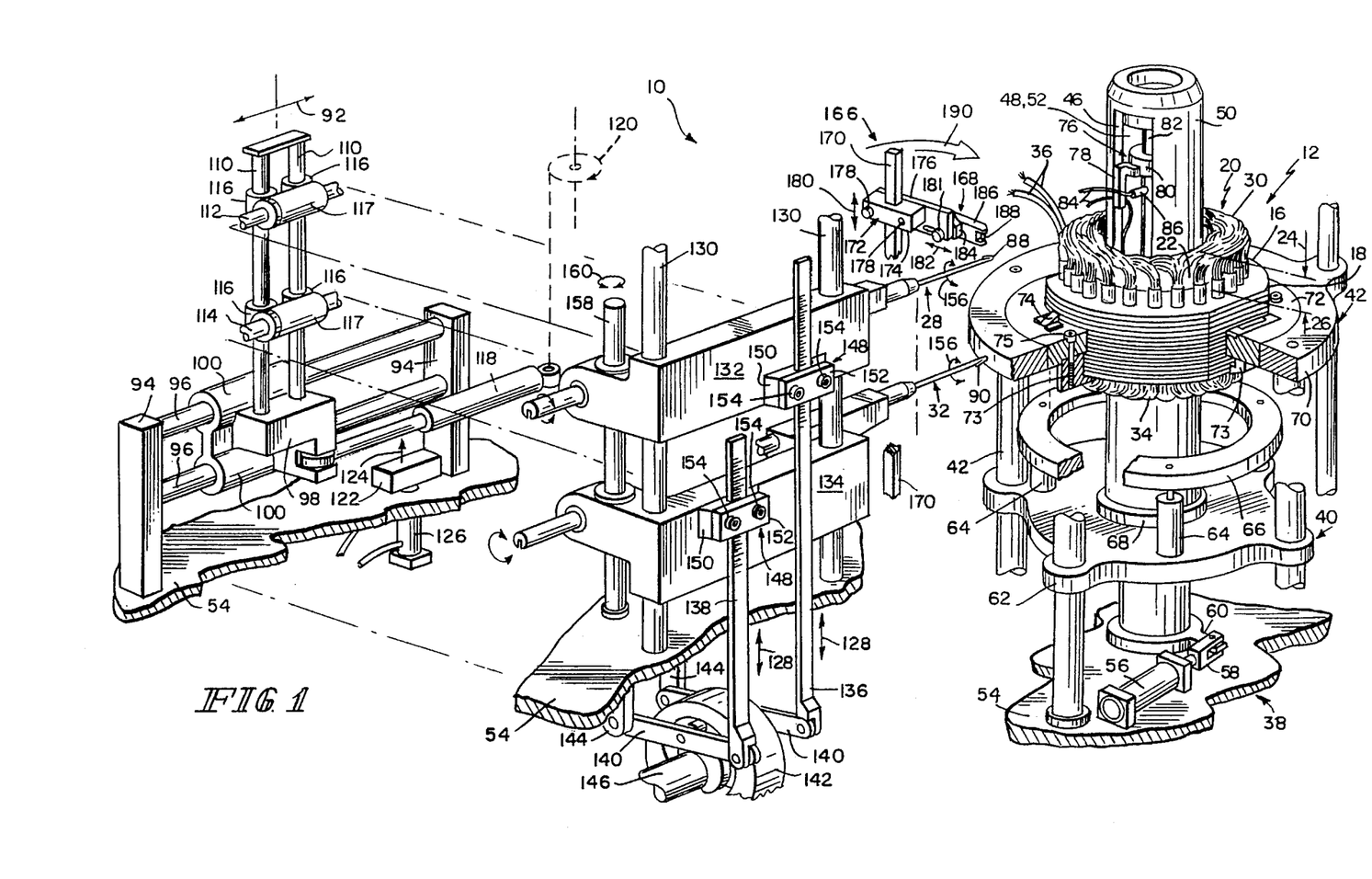
FIG. 1 is an exploded perspective view of a stator coil lacing machine constructed in accordance with the present invention.

FIG. 1 shows a stator coil lacing machine 10 constructed in accordance with the present invention. Stator coil lacing machine 10 includes work station area 12 and lacing needle actuating mechanism 14. A stator 16 is shown mounted on work station area 12. Stator 16 includes a metal core 18 formed from stacked laminations with conducting wires oriented axially through metal core 18. These wires are grouped together into end coils or end windings 20 which converge into a generally toroidal-shaped configuration on the ends of stator 16. Openings 22 are formed between end coils 20 of stator 16. Arrows 24 and 26 and the lines associated therewith extending from end coils 20 of stator 16 generally denote the particular stitch window for end coils 20 of stator 16. The stitch window represents the distance, in the direction of the longitudinal axis of stator 16, that upper lacing needle 28 of lacing needle actuating mechanism 14 travels during lacing of upper end coils or end turns 30. Lower lacing needle 32 has a stitch window (not shown) associated with its movements in the direction of the longitudinal axis of stator 16 during lacing of lower end coils or end turns 34. Electrical power is supplied to stator 16 via stator coil leads 36 extending therefrom.

Work station area 12 includes a lower section 38, an intermediate section 40, and an upper section 42. Lower section 38, intermediate section 40, and upper section 42 are connected together via a plurality of spacers 44. Work station area 12 also includes an inner arbor 46 having an opening 48 in a part of a longitudinal length of the periphery thereof and an outer arbor 50 also having an opening 52 in a part of a longitudinal length of the periphery thereof. A portion of inner arbor 46 is disposed within outer arbor 50 such that outer arbor 50 surrounds a portion of the periphery of inner arbor 46. Inner arbor 46 is disposed within outer arbor 50 such that the respective openings 48 and 52 therein are aligned. As can be seen from FIG. 1, work station area 12 is mounted on platform 54.

Lower section 38 of work station area 12 includes a pneumatic cylinder 56 having a clevis 58 on a moving end that is coupled to a lever 60 secured around a periphery portion of inner arbor 46. The combination of pneumatic cylinder 56, clevis 58, and lever 60 rotate inner arbor 46 during certain portions of the lacing of stator 16 as will be discussed below.

Intermediate section 40 includes a base 62 secured to spacers 44, a plurality of pneumatic cylinders 64, and clamp ring 66. A flange 68 on a periphery portion of outer arbor 50 abuts base 62 of intermediate section 40. Flange 68 in connection with base 62 controls the extent to which inner arbor 46 is disposed within outer arbor 50.

Upper section 42 of work station area 12 includes a stationary ring 70, a rotating nest 72, a plurality of stator supports 73, and a plurality of stator clamps 74. As can be partially seen in FIG. 1, spacers 44 abut a bottom portion of stationary ring 70. Stator supports 73 position stator 16 on outer arbor 50. Stator supports 73 are attached to rotating nest 72 via threaded screws 75. Stator clamps 74 engage metal core 18 of stator 16 so that rotating nest 72 can advance stator 16 in a generally circular direction during lacing of end coils 20. Upon completion of the lacing of end coils 20, pneumatic cylinders 64 actuate clamp ring 66 causing it to move and bias stator clamps 74 so that they no longer engage metal core 18 of stator 16. This allows stator 16 to be removed from stator coil lacing machine 10.

An upper lacing cord clamp 76 is shown as being disposed within both inner and outer arbors 46 and 50. Upper lacing cord clamp 76 includes a generally L-shaped clamp portion 78 that is connected to a ring clamp 80. Ring clamp 80 in turn is disposed around inner lacing cord feeder tube 82 and drivingly connected to inner arbor by upper lacing cord clamp adjusting fastener 83 (see FIG. 2). Upper lacing cord clamp 76 secures lacing cord 84 during certain portions of the lacing cycle of end coils 20 of stator 16. An upper lacing cord pin 86 directs lacing cord 84 supplied by inner lacing cord feeder tube 82 toward upper lacing needle 28 so that upper lacing needle 28 can lace upper end coils 30.

Lacing needle actuating mechanism 14 includes upper and lower lacing needles 28 and 32 which have hooks 88 and 90 formed on the ends thereof. Lacing needle actuating mechanism 14 controls movement of upper and lower needles 28 and 32 radially with respect to stator 16, axially with respect to stator 16, and rotationally relative to stator 16. Radial movement of upper and lower needles 28 and 32 (i.e., horizontal movement in the direction of arrows 92) is provided by utilization of a pair of vertically extending posts 94 which provide mounts for horizontal slide bars 96. Block 98 is movable along horizontal slide bars 96 via collars 100 which are cast onto block 98. Vertical slide bars 110 connect upper needle rod 112 and lower needle rod 114 to block 98 via collars 116 which are cast onto needle housings 117. Cylinder 118 drivingly connects block 98 with a crank shaft (not shown) which provides an eccentric drive path 120 to reciprocate cylinder 118 and block 98 in the horizontal direction indicated by arrows 92. Upper and lower needles 28 and 32 are thus reciprocated in the direction of arrows 92. Needles 28 and 32 are reciprocated in the direction of arrows 92 so that they can move into and out of openings 22 of stator 16 during the lacing of end coils 20 thereof.

A stop block 122 of substantially rectangular shape is movable in the direction of arrow 124 via pneumatic cylinder 126. When moved in the direction of arrow 124, stop block 122 prevents movement of block 98 past a predetermined point. Limitation of the movement of block 98 prevents needles 28 and 32 from entering openings 22 of stator 16.

Movement of upper and lower lacing needles 28 and 32 in the direction of the longitudinal axis of stator 16 (i.e., in the direction of arrows 128) is controlled by vertical slide bars 130. Upper needle housing 132 and lower needle housing 134 are movable along vertical slide bars 130. Upper and lower needle housings 132 and 134 are driven via upper and lower needle housing lift links 136 and 138 which are connected via cam followers 140 to cam 142. Cam followers 140 are attached to base 54 via connecting posts 144. Cam 142 is driven via connection with rotating shaft 146 which is driven by a motor (not shown).

Upper and lower needle housings 132 and 134 are connected to upper and lower needle housing lift links 136 and 138 via two-piece clamps 148. Clamps 148 include first portions 150 and second portions 152. First portions 150 of clamps 148 are connected to both upper and lower needle housings 132 and 134. Second portions 152 are releasably secured to first portions 150 by fasteners 154. In this manner, clamps 148 are releasably secured around peripheral portions of upper and lower needle housing lift links 136 and 138. Clamps 148 in combination with fasteners 154 allow the relative position of upper and lower needle housings 132 and 134 to be adjusted along at least a portion of the longitudinal length of links 128 and 130 to accommodate a range of stator sizes. Usually, however, only the position of the upper needle housing 132 is adjusted to accommodate differently sized stators 16 because stator supports 73 position the lower portion of stator 16 a constant distance below stationary ring 70 and rotating nest 72.

Rotational movement of upper and lower needles 28 and 32 (i.e., movement in the direction of arrows 156) is controlled via rotation of shaft 158 in the direction of arrows 160. Shaft 58 drivingly engages gears (not shown) mounted in upper and lower needle housings 132 and 134 in which upper and lower lacing needles 28 and 32 are respectively disposed. These gears convert the rotational movement of shaft 158 in the direction of arrows 160 into rotational movement of upper and lower lacing needles 28 and 32 in the direction of arrows 156.

Stator 16 as shown in FIG. 1 has a particular length associated with it also known as the stack height of stator 16. The portion of this length that appears above stationary ring 70 and rotating nest 72 and below upper end coils 30 is important in that various adjustments can be made to stator coil lacing machine 10 in order to accommodate the particular stack height of stator 16. That is, adjustments can be made to both work station area 12 and lacing needle actuating mechanism 14 in order to stitch lacing cord 84 around end coils 20 of stator 16. These adjustments are dictated by the portion of the stack height of stator 16 that appears above stationary ring 70 and rotating nest 72 because stator supports 73 position stator 16 on outer arbor 50 such that the portion of stator 16 that appears below stationary ring 70 and rotating nest 72 is constant.

Lacing cord cutting mechanism 166 is also shown in FIG. 1. Lacing cord cutting mechanism 166 includes a lacing cord cutter 168 mounted on a generally vertically extending tool bar 170 by vertically adjustable mount 172. Vertically adjustable mount 172 includes first and second portions 174 and 176 which are substantially rectangular in shape and connected to one another. Fasteners 178 disposed in first and second portions 174 and 176 releasably secure second portions 174 and 176 around a peripheral portion of tool bar 170. First and second portions of vertically adjustable mount 172 along with fasteners 178 allow the relative positioning of lacing cord cutter 168 to be adjusted along at least a portion of the longitudinal length of tool bar 170 in the direction of arrows 180. Fastener 181 allows the position of lacing cord cutter 168 relative to vertically adjustable mount 172 to be adjusted in the direction of arrows 182.

Lacing cord cutter 168 is connected to vertically adjustable mount 172 by block 184. Lacing cord cutter 168 includes a head portion 186 that has a single heated wire 188 mounted therein. A pneumatic cylinder (not shown) advances lacing cord cutter 168 in the general direction of arrow 190 upon completion of the lacing of upper end coils 30 of stator 16 so that a portion of lacing cord 84 can be cut and stator 16 removed from work station area 12. Although not shown, it is to be understood that a lower cord cutter 168 and vertically adjustable mount are also mounted on tool bar 170 so that lacing cord 84 can be cut upon completion of the lacing of lower end coils 34.

Figures 2, 3, 4, 5, 6, 7:
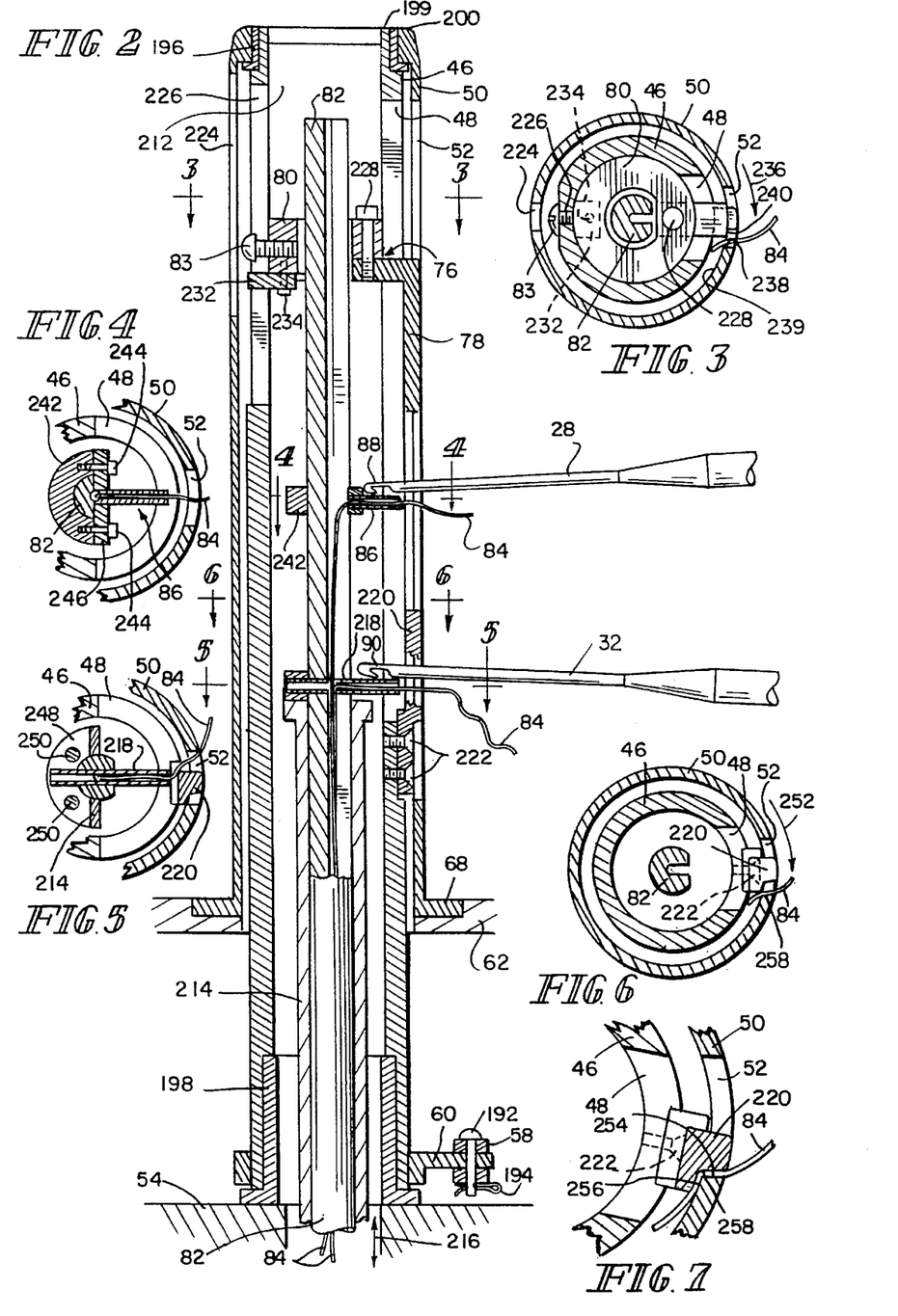
FIG. 2 is a cross-sectional view through inner and outer arbors of the stator coil lacing machine shown in FIG. 1.
FIG. 3 is a cross-sectional view taken along line 3—3 of FIG. 2.
FIG. 4 is a cross-sectional view taken along line 4—4 of FIG. 2 with portions broken away.
FIG. 5 is a cross-sectional view taken along line 5—5 of FIG. 2 with portions broken away.
FIG. 6 is a cross-sectional view taken along line 6—6 of FIG. 2.
FIG. 7 is an enlarged view of FIG. 6 with portions broken away.

FIG. 2 illustrates a cross-sectional view through inner and outer arbors 46 and 50 shown in FIG. 1. A pin 192 is shown as being disposed in openings through clevis 58 and lever 60 so as to connect lever 60 to pneumatic cylinder 56 shown in FIG. 1. As can be seen in FIG. 2, lever 60 surrounds a lower periphery portion of inner arbor 46 so as to be in driving engagement therewith. Pin 192 is secured within the openings in clevis 58 via cotter pin 194. Bearings 196 and 198 are shown as being disposed between inner arbor 46 and outer arbor 50. Bearings 196 and 198 reduce friction between inner and outer arbors 46 and 50 during rotation of inner arbor 46 by cylinder 56, clevis 58 and lever 60. Lubrication such as grease may be applied to portions of the surfaces of bearings 196 and 198 in an attempt to further reduce friction between inner and outer arbors 46 and 50. FIG. 1 shows both the top portions 199 and 200 of respective inner and outer arbors 46 and 50 as being open. Access to interior 212 of inner arbor 46 is necessary for such things as pulling lacing cord 84 up through inner lacing cord feeder tube 82.

An outer lacing cord tube 214 is shown as surrounding a periphery portion of inner lacing cord feeder tube 82. Both inner and outer lacing cord feeder tubes 82 and 214 are reciprocally moved in the direction of arrows 216 during lacing of end coils 20 of stator 16. Movement of inner and outer lacing cord feeder tubes 82 and 214 in the direction of arrows 216 allows upper and lower lacing cord pins 86 and 218, which are respectively attached to inner lacing cord feeder tube 82 and outer lacing cord feeder tube 214, to move therewith. This allows both the upper and lower end coils 30 and 34 of stator 16 to be laced as discussed below in connection with FIGS. 8 and 9.

In FIG. 2, upper lacing cord clamp 76 and upper lacing cord pin 86 are shown, as are lower lacing cord clamp 220 and lower lacing cord pin 218. Fasteners 222 are shown as connecting lower lacing cord clamp 220 to inner arbor 46. Outer arbor 50 is shown as having an access slot 224 that runs along a part of the longitudinal length of the periphery of outer arbor 50 and lies adjacent an adjusting slot 226 that extends along a part of the longitudinal length of the periphery of inner arbor 46.

FIGS. 2 and 3 (a cross-section through FIG. 2 along line 3—3) show ring clamp 80 disposed around inner lacing cord feeder tube 82 and drivingly connected to inner arbor by adjusting fastener 83. Generally L-shaped clamp 78 is secured to ring clamp 80 via fastener 228. Fastener 228 is shown as a shoulder screw. Upper lacing cord clamp adjusting fastener 83 is disposed within adjusting slot 226 formed in inner arbor 46. Adjusting slot 226 and fastener 83 allow ring clamp 80 to be movably positioned along a portion of the longitudinal length of inner arbor 46. In this way, upper lacing cord clamp 76 can be movably positioned within openings 48 and 52 of respective inner and outer arbors 46 and 50. As will be discussed below, this allows upper lacing cord clamp 76 to be adjusted so as to accommodate a range of stator stack heights. Fastener 83 is shown as being a screw. A key 232 is connected to ring clamp 80 via fastener 234. Fastener 234 is shown as a screw. Key 232 drivingly engages adjusting slot 226 of inner arbor 46 so that when inner arbor 46 rotates, upper lacing cord clamp 76 also rotates. Rotation of inner arbor 46 and upper lacing cord clamp 76 is generally indicated by arrow 236 in FIG. 3. Upper lacing cord clamp 76 is moved in the direction of arrow 236 in order to fixedly secure lacing cord 84 against movement between wall 238, formed by a portion of the periphery of the side of the opening 52 formed in outer arbor 50, interior portion 239 of outer arbor 50, and generally L-shaped clamp 78 of upper lacing cord clamp 76. A notch 240 formed in generally L-shaped clamp 78 facilitates this clamping as will be discussed below in connection with FIG. 7.

FIGS. 2 and 4 (a cross-sectional view of FIG. 2 taken along line 4—4 thereof) show clamp collar 242 and upper lacing cord pin 86 surrounding a peripheral portion of inner lacing cord feeder tube 82. Clamp collar 242 and upper lacing cord pin 86 are releasably secured to inner lacing cord feeder tube 82 via fasteners 244. Fasteners 244 allow the position of upper lacing cord pin 86 and clamp collar 242 to be adjusted along a portion of the longitudinal length of inner lacing cord feeder tube 82 adjacent openings 48 and 52 in respective inner and outer arbors 46 and 50. As can be seen in FIG. 4, fasteners 244 include a pair of screws that threadingly engage a bar portion 246 of upper lacing cord pin 86 and clamp collar 242. As can also be seen in both FIGS. 2 and 4, fasteners 244 are readily accessible via openings 48 and 52 in inner and outer arbors 46 and 50.

FIG. 5 shows a cross-sectional view taken along line 5—5 of FIG. 2. Lower lacing cord pin 218 is shown as being disposed through inner lacing cord feeder tube 82 and in lower lacing cord pin mount 248. Lower lacing cord pin mount 248 is connected to outer lacing cord feeder tube 214 via fasteners 250 which may include posts formed on outer lacing cord feeder tube 214 or screws. This connection allows lower lacing cord pin 218 to move with outer lacing cord feeder tube 214. Unlike upper lacing cord pin 86, lower lacing cord pin 248 is not adjustable.

FIG. 6 shows a cross-sectional view taken along line 6—6 of FIG. 2. Lower lacing cord clamp 220 is shown as being fixedly secured to inner arbor 46 via fasteners 222. In this way, lower lacing cord clamp 220 is drivingly secured to inner arbor 46 such that rotation of inner arbor 46 in the general direction indicated by arrow 252 will cause lower lacing cord clamp 220 to also move in that direction. Mounting of fasteners 222 directly to inner arbor 46 does not allow for the adjustment of the positioning of lower lacing cord clamp 220.

FIG. 7 is an enlarged view of FIG. 6 illustrating the clamping of lacing cord 84 between lower lacing cord clamp 220, wall 254, formed by a portion of the periphery of the side of opening 52 formed in outer arbor 42, and interior portion 256 of outer arbor 50. In this way, lacing cord 84 is fixedly secured against movement.

As can be seen in both FIGS. 6 and 7, a notch 258 is formed in a portion of lower lacing cord clamp 220. Notch 258 is the same as notch 240 formed in generally L-shaped clamp 78. Discussion with regard to the functioning of notch 258 is also applicable to notch 240. As can be seen in FIG. 7, notch 258 is formed in lower lacing cord clamp 220 in such a manner as to correspond to both the width and angle of wall 254 of opening 52 in outer arbor 50 as well as an interior portion 256 of outer arbor 50. Forming notch 256 in this manner helps to ensure that lacing cord 84 will remain fixedly secured between lower lacing cord clamp 220, wall 254 and interior portion 256.

As will be appreciated from the above description of FIGS. 1–7, the relative positioning of the lacing cord handling components of stator coil lacing machine 10, namely upper and lower lacing needles 28 and 32, upper lacing cord clamp 76, and upper lacing cord pin 86, can be adjusted without disassembly of the stator coil lacing machine so as to accommodate a range of stator stack heights. For example, as described above, the positioning of upper lacing cord clamp 76 can be adjusted via loosening and subsequent tightening of adjusting fastener 83 via access and adjustment slots 224 and 226. Because stator coil lacing machine 10 does not have to be disassembled to adjust the string handling components thereof in order to accommodate a particular stator stack height, time is saved. Reduction in conversion time results in decreased labor costs and increased productivity.

Another advantage of the stator coil lacing machine of the present invention is that both upper and lower lacing cord clamps 76 and 220 are contained within inner and outer arbors 46 and 50 and are drivingly connected with inner arbor 46. This results in a generally smaller longitudinal length for inner and outer arbors 46 and 50 than with stator coil lacing machine designs that utilize one or more pneumatically or fluidly actuated clamps. Smaller longitudinal lengths for inner and outer arbors 46 and 50 has the advantage of allowing stators laced thereon to more easily be removed by an operator.

As discussed previously, some stator coil lacing machines utilize clamps that are externally mounted relative to arbors of the machines. These clamps are used to pull lacing cord stitched around end coils of a stator upon completion of lacing in order to set any knots formed to secure the stitching. These external clamps often generate excess pieces of lacing cord that must be cut and vacuumed away prior to removal of a stator from a machine. This results in waste of lacing cord and the need for extra components for a machine. Another advantage of the configuration of upper and lower lacing cord clamps 76 and 220 is that they secure lacing cord 84 during lacing of the end coils 20 of a stator so that excess lacing cord does not have to be cut and vacuumed away upon completion of a lacing cycle. This conserves lacing cord and reduces the number of components necessary to construct a stator coil lacing machine.

Figure 8:
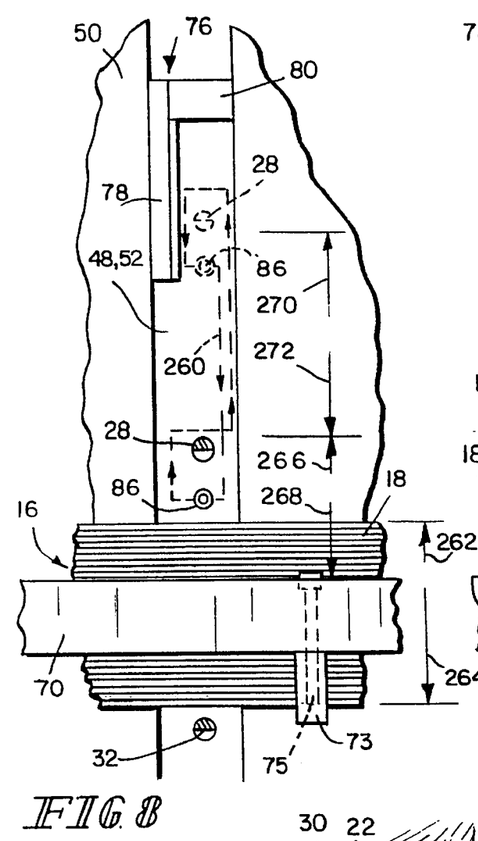
FIG. 8 illustrates relative positioning of an upper clamp and travel paths for an upper cord pin and upper lacing needle of the stator coil lacing machine of the present invention that accommodates a particular stator stack size.
Figure 9:
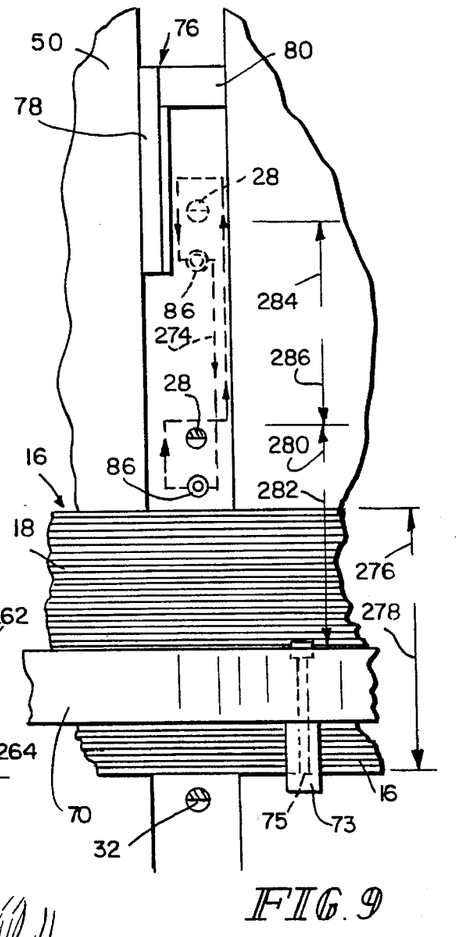
FIG. 9 illustrates the relative positioning of the upper cord clamp and travel paths for the upper cord pin and upper lacing needle of the stator coil lacing machine of the present invention that accommodates a stator stack size larger than that of FIG. 8 but having the same end coil or end turn height as the stator of FIG. 8.

FIG. 8 illustrates a path 260 traveled by upper lacing cord pin 86 during formation of a lacing stitch around upper end coils 30 (not shown) of stator 16. Also illustrated is the relative movement of upper lacing needle 28. Stator 16 is shown as having a particular length or stack height generally indicated by arrows 262 and 264. Arrows 266 and 268 generally indicate the distance between the bottom of upper end coils or end turns 30 and the top of stationary ring 70. The length or height of upper end turns 30 is generally indicated by arrows 270 and 272. Upper lacing needle 28 must travel at least the distance of this height in order to stitch lacing cord 84 around end turns 30. FIG. 9 illustrates a path 274 traveled by upper lacing cord pin 86 during formation of a stitch around upper end coils 30 (not shown) of stator 16 having a larger stack height, generally indicated by arrows 276 and 278, than the stack height of stator 16 generally indicated by arrows 262 and 264 in FIG. 8. Longitudinal movement of upper lacing needle 28 is also illustrated. Arrows 280 and 282 generally indicate the distance between the bottom of upper end coils or end turns 30 and the top of stationary ring 70. The length or height of upper end turns 30 is generally indicated by arrows 284 and 286. As discussed above, upper lacing needle 28 must travel at least the distance of this height in order to stitch lacing cord 84 around end turns 30. As can be seen from comparison of FIGS. 8 and 9, the end coil heights of stators 16 generally indicated by arrows 270 and 272 and 284 and 286 in respective FIGS. 8 and 9 are substantially equal. In addition, the longitudinal length traveled by upper lacing needle 30 and upper lacing cord pin 86 generally indicated by travel paths 260 and 274 are substantially equal. FIG. 9 illustrates the adjustments made to the relative positioning of upper lacing needle 28, upper lacing cord clamp 76, and upper lacing cord pin 86 along the longitudinal length of arbors 46 and 50 to accommodate a stator 16 having a larger stack height but generally equal upper end turn height as stator 16 of FIG. 8. As can also be seen from both FIGS. 8 and 9, adjustment of one or more of lower lacing needle 32, lower lacing cord pin 218, and lower lacing clamp 220 to accommodate stators 16 with differing stack heights is unnecessary because stator supports 73 position that portion of stator 16 below stationary ring 70 and rotating nest 72 at a constant distance.

As was discussed in connection with FIG. 2, movement in the direction of arrows 216 (see FIG. 2) of upper lacing cord pin 86 can be seen as part of the direction of its travel illustrated by either of paths 260 or 274. Upper lacing cord pin 86 moves in the direction of either path 260 or 274 in order to supply lacing cord 84 to upper lacing needle 28. Lower lacing cord pin 218 travels paths substantially similar to those generally illustrated by reference numerals 260 and 274 in order to supply lacing cord 84 to lower lacing needle 32.

Figure 10:
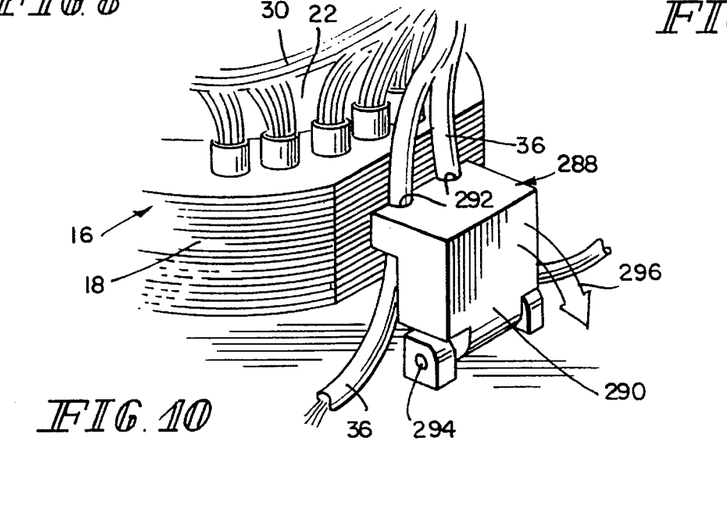
FIG. 10 shows a perspective view of a lead retainer for use with the stator coil lacing machine of the present invention.

FIG. 10 illustrates a preferred embodiment of a lead retainer 288 for use with stator coil lacing machine 10. FIG. 10 shows leads 36 of stator 16 being secured within lead retainer 288. Lead retainer 288 includes a block 290 having grooves 292 formed therein. The number of grooves 292 formed in block 290 corresponds to the number of leads 36 of stator 16. Block 290 is pivotally connected via hinge 294 so as to be movable in the direction generally indicated by arrow 296. In this way, block 290 can be moved so as to both engage leads 36 during lacing and disengage leads 36 subsequent to lacing. Lead retainer 288 is intended to reduce the likelihood of leads 36 coming into contact with upper and lower lacing needles 28 and 32 during lacing of end coils 20 of stator 16. Use of lead retainer 288 eliminates the need for an operator to manually hold and move leads 28 during the lacing cycle. This thus frees the operator to perform other tasks during the lacing of the end coils 20 of stator 16.

The stator coil lacing machine 10 of the present invention has many advantages associated with it, some of which have been discussed above. Another advantage includes the reduced handling required during lacing of the end coils 20 of stator 16. Specifically, an operator does not have to handle leads 36 of stator 16 during lacing to prevent their possible contact with upper and lower lacing needles 28 and 32. This allows the operator to perform other tasks during lacing and thus allows an operator to be more productive. Furthermore, because the operator does not have to handle leads 36, safety is increased in that possible contact of lacing needles 28 and 32 with such things as the fingers and hands of an inadvertent or careless operator during lacing is avoided.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A method of adjusting a stator coil lacing machine without disassembly of the machine to accommodate a range of stator stack heights, the machine including an arbor, stitching means for stitching lacing cord around coils of the stator, delivering means positioned within the arbor for delivering lacing cord to the stitching means, and securing means positioned within the arbor for securing the lacing cord, the method comprising the steps of:

orienting a stator on the arbor of the stator coil lacing machine so that coils thereof can be laced, the stator having a particular stack height;

adjusting the delivering means to accommodate the particular stack height of the stator;

adjusting the stitching means to accommodate the particular stack height of the stator and position the stitching means relative to the delivering means; and adjusting the securing means to accommodate the particular stack height of the stator and position the securing means relative to the delivering means and stitching means, wherein the delivering means, stitching means, and securing means are adjusted without disassembly of the stator coil lacing machine.

2. The method of claim 1, wherein the delivering means, stitching means, and securing means are adjusted via loosening and subsequent tightening of screws that can be accessed without disassembly of the stator coil lacing machine.

3. The method of claim 1, wherein the stator coil lacing machine includes cutting means for cutting through lacing cord upon completion of lacing of the stator coils of the stator, and the method further includes the step of adjusting the cutting means to accommodate the particular stator stack height of the stator and position the cutting means relative to the delivering means, stitching means, and securing means.

4. The method of claim 1, wherein the stator coil lacing machine has upper and lower delivering means, upper and lower stitching means, and upper and lower securing means, and the method further includes the steps of only adjusting the upper delivering means, upper stitching means, and upper securing means to accommodate the particular stack height of the stator.

5. The method of claim 4, wherein the stator coil machine also includes cutting means for cutting lacing cord upon completion of lacing of the stator coils of the stator, and the method further includes the step of adjusting the cutting means to accommodate the particular stator stack height and position the upper cutting means relative to the upper delivering means, upper stitching means, and upper securing means.

6. The method of claim 1, wherein the stator coil lacing machine also includes a lead retainer, and the method includes the step of positioning the lead retainer around leads of a stator during lacing of the stator coils of the stator.

* * * * *